United States Patent
Tian et al.

(10) Patent No.: US 10,770,096 B1
(45) Date of Patent: Sep. 8, 2020

(54) DUAL WRITER WITH BRIDGED CONNECTION

(71) Applicant: Seagate Technology LLC, Cupertino, CA (US)

(72) Inventors: Wei Tian, Eden Prairie, MN (US); Javier Guzman, Minneapolis, MN (US); Jianhua Xue, Maple Grove, MN (US); Kirill Rivkin, Edina, MN (US); Jian Zhong, Eden Prairie, MN (US); Lei Lu, Bloomington, MN (US)

(73) Assignee: SEAGATE TECHNOLOGY LLC, Fremont, CA (US)

(*) Notice: Subject to any disclaimer, the term of this patent is extended or adjusted under 35 U.S.C. 154(b) by 0 days.

(21) Appl. No.: 16/273,778

(22) Filed: Feb. 12, 2019

(51) Int. Cl.
  *G11B 5/48* (2006.01)
  *G11B 5/10* (2006.01)
  *G11B 5/008* (2006.01)

(52) U.S. Cl.
  CPC ........... *G11B 5/10* (2013.01); *G11B 5/00826* (2013.01); *G11B 5/484* (2013.01)

(58) Field of Classification Search
  CPC ..... G11B 5/4853; G11B 5/486; G11B 5/6005; G11B 19/02; G11B 5/10; G11B 5/484; G11B 5/00826
  See application file for complete search history.

(56) References Cited

U.S. PATENT DOCUMENTS

| | | | |
|---|---|---|---|
| 8,049,988 B2* | 11/2011 | Kameda | G11B 5/315 360/119.04 |
| 8,310,782 B2 | 11/2012 | Song et al. | |
| 9,299,367 B1* | 3/2016 | Tang | G11B 5/127 |
| 9,495,980 B1* | 11/2016 | Sasaki | G11B 5/1278 |
| 9,502,053 B1* | 11/2016 | Sasaki | G11B 5/3116 |
| 9,653,100 B1* | 5/2017 | Sasaki | G11B 5/3912 |
| 9,666,212 B2* | 5/2017 | Han | G11B 5/012 |
| 9,773,517 B2* | 9/2017 | Gao | G11B 5/4984 |
| 9,805,744 B1 | 10/2017 | Xue et al. | |
| 9,858,961 B2 | 1/2018 | Zhu et al. | |
| 9,865,301 B1* | 1/2018 | Wiesen | G11B 5/265 |
| 9,899,042 B1* | 2/2018 | Venugopal | G11B 5/315 |
| 9,934,807 B2* | 4/2018 | Macken | G11B 5/6076 |
| 10,210,891 B1* | 2/2019 | Tian | G11B 5/012 |
| 10,418,054 B1* | 9/2019 | Liu | G11B 5/315 |
| 10,600,435 B2* | 3/2020 | Klarqvist | G11B 5/6005 |
| 2004/0042118 A1 | 3/2004 | Notsuke et al. | |
| 2008/0024900 A1* | 1/2008 | Okamoto | G11B 5/012 360/70 |
| 2008/0221981 A1 | 9/2008 | Biskeborn | |
| 2008/0231985 A1 | 9/2008 | Okamoto | |
| 2009/0251821 A1* | 10/2009 | Song | G11B 5/1278 360/110 |
| 2011/0075294 A1* | 3/2011 | Fuchizaki | G11B 5/1278 360/123.12 |
| 2014/0153134 A1* | 6/2014 | Han | G11B 5/012 360/234.3 |

(Continued)

*Primary Examiner* — Brian E Miller
(74) *Attorney, Agent, or Firm* — Westman, Champlin & Koehler, P.A.

(57) ABSTRACT

A recording head includes a bearing surface, a first writer and a first shield structure for the first writer. The recording head also includes a second writer and a second shield structure for the second writer. The recording head further includes a magnetic bridge connecting the first shield structure to the second shield structure at the bearing surface.

20 Claims, 5 Drawing Sheets

(56) References Cited

U.S. PATENT DOCUMENTS

| | | | |
|---|---|---|---|
| 2015/0138671 A1* | 5/2015 | Sasaki | G11B 5/127 360/123.02 |
| 2019/0066717 A1* | 2/2019 | Ohtake | G11B 5/11 |
| 2019/0304490 A1* | 10/2019 | Liu | G11B 5/2652 |
| 2019/0333531 A1* | 10/2019 | Liu | G11B 5/17 |

* cited by examiner

DUAL WRITER WITH BRIDGED CONNECTION

SUMMARY

In one embodiment, a recording head is provided. The recording head includes a bearing surface, a first writer and a first shield structure for the first writer. The recording head also includes a second writer and a second shield structure for the second writer. The recording head further includes a magnetic bridge connecting the first shield structure to the second shield structure at the bearing surface.

In another embodiment, a method of forming a recording head is provided. The method includes forming first and second write poles. The method also includes forming first and second shield structures for the respective first and second write poles and a magnetic bridge connecting the first and second shield structures.

In yet another embodiment, a dual writer is provided. The dual writer includes first and second main write poles. The dual writer also includes a magnetic bridge connection between a first shield structure for the first main write pole and a second shield structure for the second main write pole.

Other features and benefits that characterize embodiments of the disclosure will be apparent upon reading the following detailed description and review of the associated drawings.

DETAILED DESCRIPTION OF ILLUSTRATIVE EMBODIMENTS

Embodiments of the disclosure relate to a recording head having, for example, two substantially coplanar writers, each having a shield, and a bridge connecting the two shields. However, prior to providing additional details regarding the different embodiments, a description of an illustrative operating environment is provided below.

Figure 1:
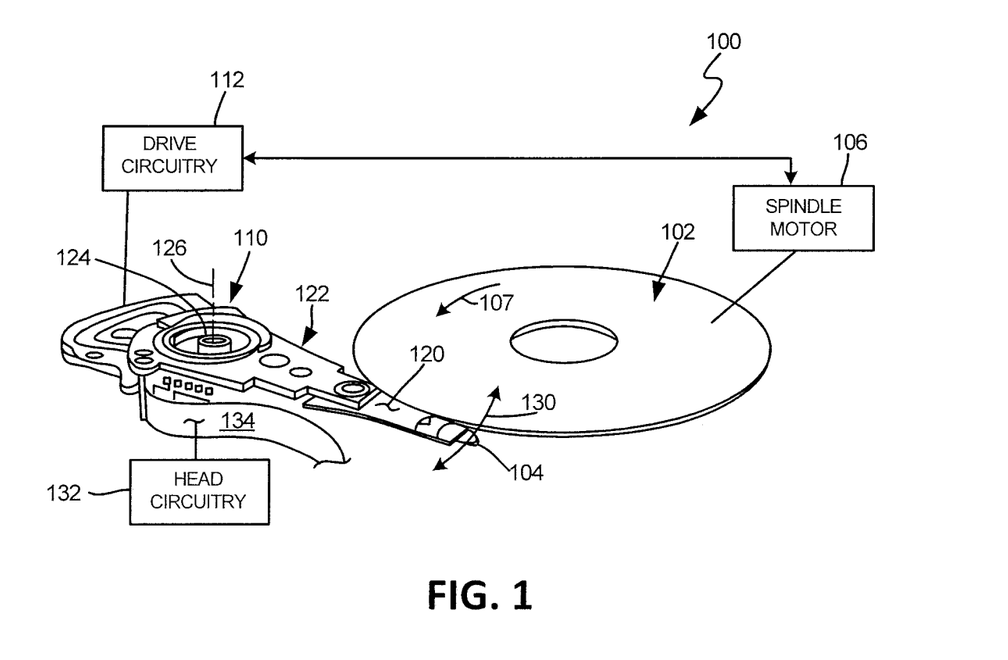
FIG. 1 illustrates an embodiment of a data storage device in which embodiments of the present application can be used.

FIG. 1 shows an illustrative operating environment in which certain writer embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1 is a schematic illustration of a data storage device 100 including a data storage medium and a head for reading data from and/or writing data to the data storage medium. As shown in FIG. 1, the data storage device 100 includes a magnetic data storage medium or disc 102 and a head 104. The head 104 including transducer elements (not shown in FIG. 1) is positioned above the data storage medium 102 to read data from and/or write data to the data storage medium 102. In the embodiment shown, the data storage medium 102 is a rotatable disc or other magnetic storage medium that includes a magnetic storage layer or layers. For read and write operations, a spindle motor 106 (illustrated schematically) rotates the medium 102 as illustrated by arrow 107 and an actuator mechanism 110 positions the head 104 relative to data tracks on the rotating medium 102. Both the spindle motor 106 and actuator mechanism 110 are connected to and operated through drive circuitry 112 (schematically shown). The head 104 is coupled to the actuator mechanism 110 through a suspension assembly which includes a load beam 120 connected to an actuator arm 122 of the mechanism 110 for example through a swage connection.

The transducer elements of the head 104 are coupled to head circuitry 132 through flex circuit 134, also known as printed circuit cable assembly (PCCA), to encode and/or decode data. Although FIG. 1 illustrates a single load beam 120 coupled to the actuator mechanism 110, additional load beams 120 and heads 104 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 104 in a cross track direction as illustrated by arrow 130.

Figure 2:
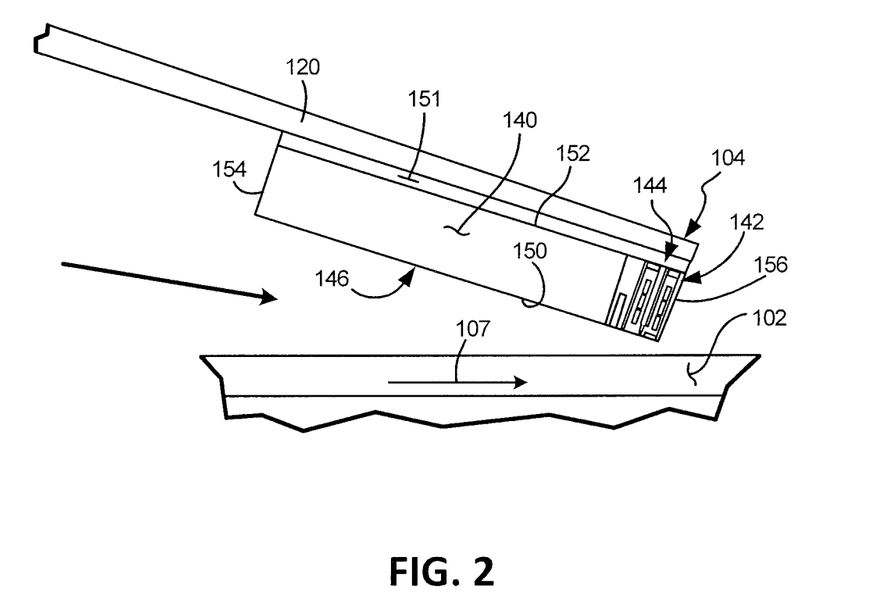
FIG. 2 is a schematic illustration of a head including one or more transducer elements above a magnetic recording medium.

FIG. 2 is a detailed illustration (side view) of the head 104 above the medium 102. The transducer elements on the head 104 are fabricated on a slider 140 to form a transducer portion 142 of the head 104. The transducer portion 142 shown includes write elements encapsulated in an insulating structure to form a write assembly 144 of the head. As shown, the head 104 includes a bearing surface (for example, and air bearing surface (ABS)) 146 along a bottom surface 150 of the head or slider facing the medium 102. The head 104 is coupled to the load beam 120 through a gimbal spring 151 coupled to a top surface 152 of the head or slider 140 facing away from the medium 102. The medium 102 can be a continuous storage medium, a discrete track medium, a bit patterned medium or other magnetic storage medium including one or more magnetic recording layers.

During operation, rotation of the medium or disc 102 creates an air flow in direction 107 as shown in FIG. 2 along the air bearing surface 146 of the slider 140 from a leading edge 154 to the trailing edge 156 of the slider 140 or head 104. Air flow along the air bearing surface 146 creates a pressure profile to support the head 104 and slider 140 above the medium 102 for read and/or write operations.

There are many applications which can benefit from having two writers as part of the same structure (e.g., head 104 of FIG. 2), with write poles at the ABS (e.g., 146 of FIG. 2) separated in a cross-track direction. However, a practical implementation may involve making drastic changes to the ratio of cross-track to down-track dimensions of the shields. These dimensional changes can affect domain wall stability of the shields, which can induce magnetic "hot spots" in the shields that could potentially erase previously written data in the medium.

In particular, if the two writers (300 and 302 shown in FIG. 3) utilize physically separated shields (e.g., separated shields 304 and 306 of FIG. 3), it is expected that, for each of the writers, the ratio of cross-track width to down-track length will decrease significantly when compared to a current single writer design. At the same time, having a single continuous shield for both writer heads may be associated with increased magnetic coupling between the writers, potentially inducing "cross-talk erasure" where the inactive writer picks up the data signal from the active writer and erases (overwrites) previously written data on a neighboring recording track.

To address the above-noted problems, embodiments of the disclosure employ shields that are physically separated at the ABS, except for one or more "bridges" that are described below in connection with FIGS. 4A, 4B and 4C.

Figure 4A:
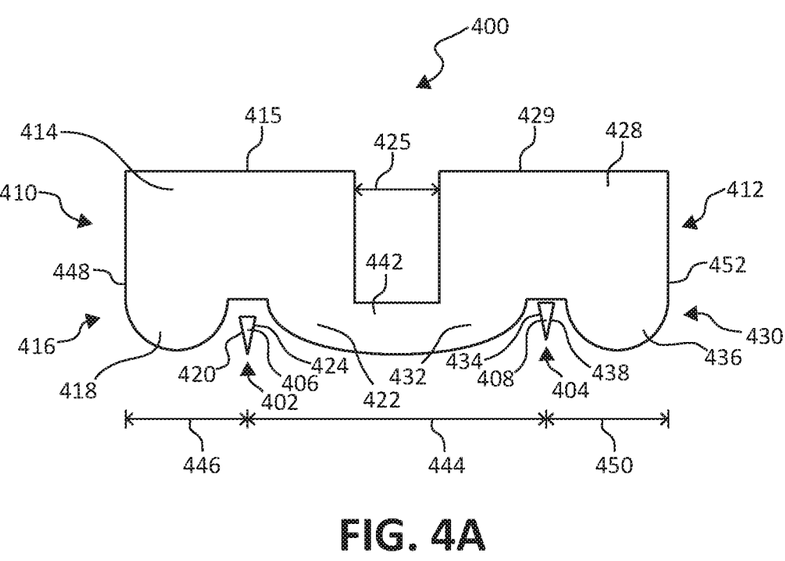
FIGS. 4A, 4B and 4C illustrate bearing surface views of dual writers with bridge connections in accordance with embodiments of the disclosure.

FIG. 4A is a diagrammatic illustration of an embodiment of a dual writer 400 viewed from an ABS. The dual writer 400 elements shown in FIG. 4A are illustratively included in a recording head such as recording head 104 of FIGS. 1 and 2.

Dual writer 400 includes two substantially coplanar writers denoted by reference numerals 402 and 404, respectively, whose main poles 406 and 408 have front surfaces at the ABS. Return poles, coils, etc., of writers 402 and 404 are not shown in the interest of simplification.

Dual writer 400 includes a first shield structure 410 for the first writer 402 and a second shield structure 412 for the second writer 404. The first shield structure 410 includes a first trailing edge shield 414 and a first side shield 416 below the first trailing edge shield 414. The first trailing edge shield 414 has a first top surface 415. As can be seen in FIG. 4A, the first side shield 416 includes a first left side portion 418 on a left side 420 of the first writer 402. Further, first side shield 416 includes a first right side shield portion 422 on a right side 424 of the first writer 402. In the embodiment of FIG. 4A, the first left side shield portion 418 is separated from the first right side shield portion 422 below the first writer 402 by, for example, an insulator 426. Insulating material may also be included between different sides of the first writer 402 and the first shield structure 410. As in the case of the first side structure 410, the second shield structure 412 includes a second trailing edge shield 428 and a second side shield 430 below the second trailing edge shield 428. The second trailing edge shield 428 has a second top surface 429 that is physically separate from the first top surface 415. The second side shield 430 includes a second left side shield portion 432 on a left side 434 of the second writer 404. Further, the second side shield 430 includes a second right side shield portion 436 on a right side 438 of the second writer 404. The second left side shield portion 432 is separated from the second right side shield portion 436 below the second writer 404 by, for example, an insulator 440. Insulating material may also be included between different sides of the second writer 404 and the second shield structure 412.

As indicated above, in embodiments of the disclosure, first shield structure 410 is physically separated from the second shield structure 412 at the ABS, except for one or more magnetic bridges. In the embodiment of FIG. 4A, a magnetic bridge at the bearing surface is denoted by reference numeral 442. In some embodiments, first shield structure 410, second shield structure 412 and bridge 442 may be formed of a same magnetic material. In other embodiments, magnetic materials used for first shield structure 410 and second shield structure 412 may be different from a magnetic material used for bridge 442, and therefore bridge 442 may have a different anisotropy than shields 410 and 412. Bridge 442 connects the first right side shield portion 422 and the second left side shield portion 432, with the first trailing shield 414 and the second trailing shield 428 remaining separated. In some embodiments, a separation distance 425 between the first trailing edge shield 414 and the second trailing edge shield 428 (and therefore a width of the bridge 442 at the ABS) is between about 0.5 (micrometers) μm to about 3 μm. However, in different embodiments, any suitable separation distance 425 between shields 414 and 428 may be employed. In the embodiment of FIG. 4A, a distance 444 between main poles 406 and 408 may be about 12 μm. Further, in this embodiment, a distance 446 between a left edge 448 of first shield structure 410 and main pole 406 may be about 6 μm. Similarly, a distance 450 between a right edge 452 of second shield structure 412 and main pole 408 may also be about 6 μm. It should be noted that the different distance values provided are examples and any other suitable distance values may be utilized in different embodiments.

Figure 4B:
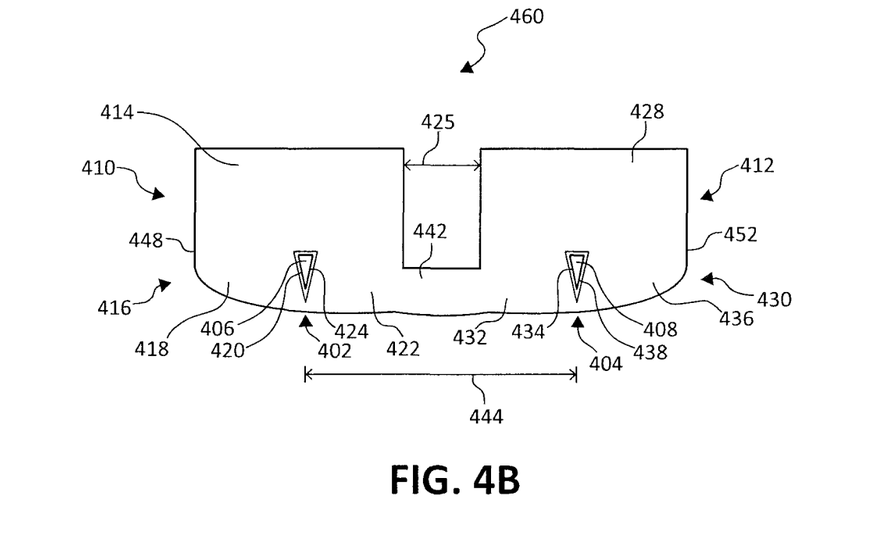

FIG. 4B is a bearing surface view of a dual writer 460 that has a wrap-around shield configuration in accordance with another embodiment. As can be seen in FIG. 4B, side shields 416 and 430 are connected below leading edges or bottom edges of main poles 406 and 408, respectively. In other respects, dual writers 400 and 460 are substantially similar. As in the case of the embodiment of FIG. 4A, in the embodiment of FIG. 4B, a distance 444 between main poles 406 and 408 may be about 12 μm. Additionally, a distance 462 between a trailing edge or top edge of main pole 406, 408 and a bottom of the wrap-around shield may be about 1 μm. As noted above, the distance values provided are examples and any other suitable distance values may be used.

Modeling shows that, in dual writers of the type shown in FIGS. 4A and 4B, the potential for cross-talk is substantially reduced compared to a single shield (e.g., physically connected trailing and side shields) design. Incorporating the bridge also offers at least two advantages. First, it can increase shape anisotropy of parts of the shield most susceptible to partial magnetic reversal. Second, the bridge can reduce potentially damaging fields that can be generated by shields in the spacing between them. While the latter improvement primarily affects the portions of shields on the right of the left write pole and on the left of the right write pole (e.g., the spacing between the write poles), it is possible to extend the effect to the other sides as well by moving the write poles closer together, thus making the other sides of the shield wider. Such an example is illustrated in FIG. 4C, which shows a bearing surface view of a dual writer 470 in accordance with another embodiment. In the example embodiment of FIG. 4C, a distance 444 between main poles 406 and 408 may be about 9 µm, which is 3 µm less than the distance between main poles 406 and 408 in the embodiment of FIG. 4A. A distance 446 between a left edge 448 of first shield structure 410 and main pole 406 may be about 9 µm, which is 3 µm greater than the distance between a left edge 448 of first shield structure 410 and main pole 406 in the embodiment of FIG. 4A. In an alternate embodiment of FIG. 4C, distance 444 between main poles 406 and 408 may remain unchanged (e.g., may remain about 12 µm), but outer left and right shield dimensions are increased or widened to, for example, about 9 µm. The distance values provided are examples and any other suitable distance values may be used.

Table 1 below is a comparison of stability (Hc (coercivity) in a cross-track direction) for dual writer designs, including the baseline design of FIG. 3, which includes two separated writers, and dual writers with magnetic bridges (shown in FIGS. 4A-4C).

TABLE 1

Figure 3:
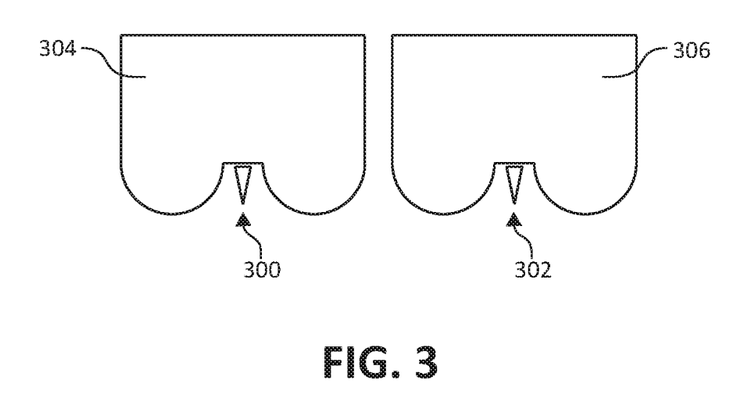
FIG. 3 is a bearing surface view of a baseline dual writer.
Figure 4C:
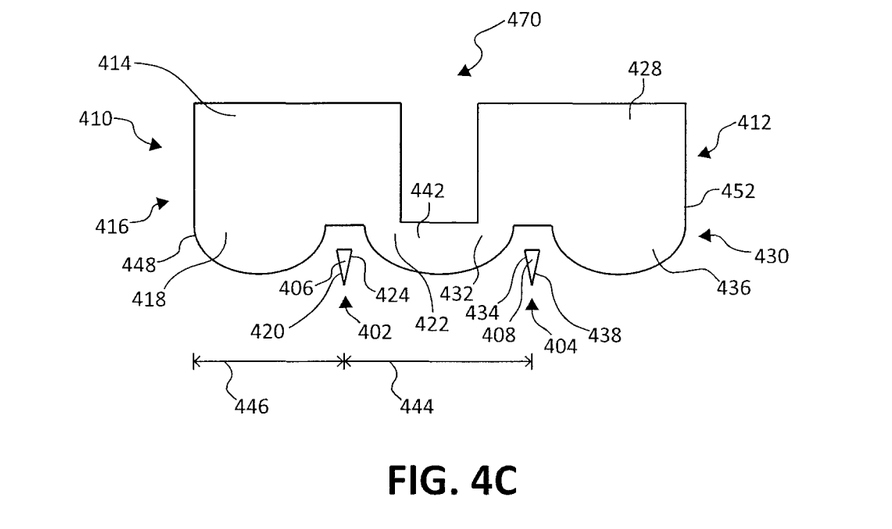

| | Dual writer of | | | |
|---|---|---|---|---|
| | FIG. 3 | FIG. 4A | FIG. 4B | FIG. 4C |
| Hc (cross-track) | 367 | 434 | 522 | 470 |

Table 1 above shows that there is a substantial improvement in stability in dual writers with bridges (FIGS. 4A-4C) over the separated writer design of FIG. 3.

The embodiments and modeling described above are in reference to a bridged side shield. However, the bridge can alternatively be located between portions of the trailing shields (e.g., between 414 and 428), as well.

Figure 5:
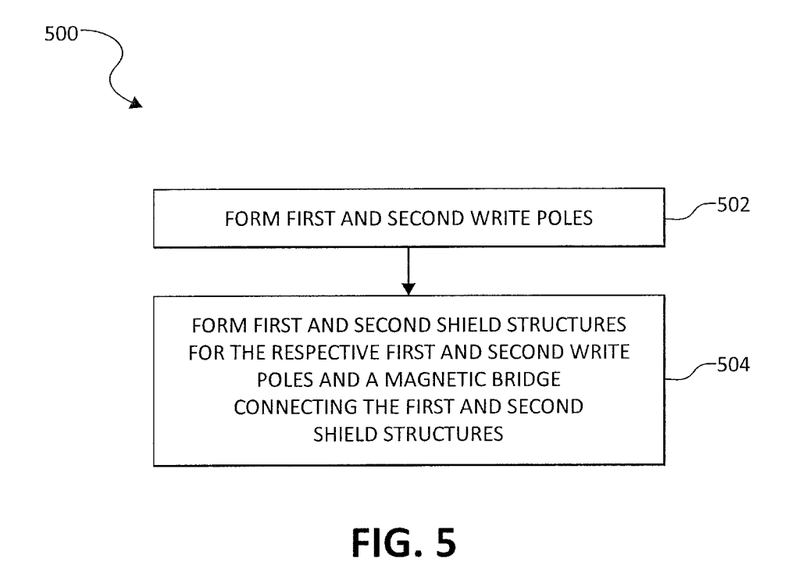
FIG. 5 is a flow diagram of a method embodiment.

FIG. 5 is a simplified flowchart of a method of forming a recording head 500 in accordance with one embodiment. The method includes, at 502, forming first and second write poles. The method also includes, at 504, forming first and second shield structures for the respective first and second write poles and a magnetic bridge connecting the first and second shield structures. As indicated above, "first" and "second" are used to distinguish or identify elements and are not used to indicate any order of performance of the method. Also, 502 and 504 (or portions of 502 and 504) may be performed in any suitable order in different embodiments.

In general, photolithography and various thin film deposition methods are used to fabricate writers. In one embodiment, write poles of first and second writers may be fabricated simultaneously at 502 of FIG. 5. This may be followed by fabricating all side shields and the bridge connecting the side shields (e.g., side shield portions of the shield structures at 504 and the bridge at 504). Then, both trailing shield portions may be formed simultaneously at 504. In an alternate embodiment in which the trailing shields are connected by the bridge, fabrication of the side shield portions at 504 may be followed by the formation of both trailing shield portions at 504 and the bridge at 504.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A recording head comprising:
    a bearing surface;
    a first writer;
    a first shield structure for the first writer, the first shield structure having a first trailing edge shield with a first top surface;
    a second writer;
    a second shield structure for the second writer, the second shield structure having a second trailing edge shield with a second top surface that is physically separate from the first top surface; and
    a magnetic bridge connecting the first shield structure to the second shield structure at the bearing surface.

2. The recording head of claim 1 and wherein the first shield structure further comprises a first side shield below the first trailing edge shield, and wherein the first side shield comprises a first left side portion on a first left side of the first writer and a first right side shield portion on a first right side of the first writer, and wherein the first left side shield portion is separated from the first right side shield portion below the first writer.

3. The recording head of claim 2 and wherein the second shield structure further comprises a second side shield below the second trailing edge shield, and wherein the second side shield comprises a second left side shield portion on a second left side of the second writer and a second right side shield portion on a second right side of the second writer, and wherein the second left side shield portion is separated from the second right side shield portion below the second writer.

4. The recording head of claim 3 and wherein:
the first right side shield portion and the second left side shield portion are connected together by the magnetic bridge; or
the first trailing edge shield and the second trailing edge shield are connected together by the magnetic bridge.

5. The recording head of claim 1 and wherein the first shield structure further comprises a first side shield below the first trailing edge shield, and wherein the first side shield comprises a first left side portion on a left side of the first writer and a first right side shield portion on a right side of the first writer, and wherein the first left side shield portion is connected to the first right side shield portion below the first writer.

6. The recording head of claim 5 and wherein the second shield structure further comprises a second side shield below the second trailing edge shield, and wherein the second side shield comprises a second left side shield portion on a left side of the second writer and a second right side shield portion on a right side of the second writer, and wherein the second left side shield portion is connected to the second right side shield portion below the second writer.

7. The recording head of claim 6 and wherein:
the first right side shield portion and the second left side shield portion are connected together by the magnetic bridge; or
the first trailing edge shield and the second trailing edge shield are connected together by the magnetic bridge.

8. The recording head of claim 3 and wherein a separation distance between the first trailing edge shield and the second trailing edge shield is between about 0.5 micrometers ($\mu$m) and about 3 $\mu$m.

9. The recording head of claim 1 and wherein a separation distance between a main pole of the first writer and a main pole of the second writer is between about 6 $\mu$m and about 40 $\mu$m.

10. A method of forming a recording head, the method comprising:
forming first and second write poles;
forming a first shield structure for the first write pole, the first shield structure having a first trailing edge shield with a first top surface;
forming a second shield structure for the second write pole, the second shield structure having a second trailing edge shield with a second to surface that is physically separate from the first top surface; and
forming a magnetic bridge connecting the first and second shield structures.

11. The method of claim 10 and wherein forming the first shield structure comprises forming:
a first side shield that comprises a first left side portion on a left side of the first write pole and a first right side shield portion on a right side of the first write pole, and wherein the first left side shield portion is separated from the first right side shield portion below the first write pole; and
the first trailing edge shield above the first side shield.

12. The method of claim 11 and wherein forming the second shield structure comprises forming:
a second side shield that comprises a second left side shield portion on a left side of the second write pole and a second right side shield portion on a right side of the second write pole, and wherein the second left side shield portion is separated from the second right side shield portion below the second write pole; and
the second trailing edge shield above the second side shield.

13. The method of claim 12 and wherein:
the magnetic bridge connects the first right side shield portion to the second left side shield portion; or
the magnetic bridge connects the first trailing edge shield to the second trailing edge shield.

14. The method of claim 10 and wherein forming the first shield structure comprises forming:
a first side shield that comprises a first left side portion on a left side of the first write pole and a first right side shield portion on a right side of the first write pole, and wherein the first left side shield portion is connected to the first right side shield portion below the first write pole; and
the first trailing edge shield above the first side shield.

15. The method of claim 14 and wherein forming the second shield structure comprises forming:
a second side shield that comprises a second left side shield portion on a left side of the second write pole and a second right side shield portion on a right side of the second write pole, and wherein the second left side shield portion is connected to the second right side shield portion below the second write pole; and
the second trailing edge shield above the second side shield.

16. The method of claim 15 and wherein:
the magnetic bridge connects the first right side shield portion to the second left side shield portion; or
the magnetic bridge connects the first trailing edge shield to the second trailing edge shield.

17. A dual writer comprising:
first and second main write poles;
a first shield structure for the first main write pole, the first shield structure having a first trailing edge shield with a first top surface;
a second shield structure for the second main write pole, the second shield structure having a second trailing edge shield with a second to surface that is physically separate from the first top surface; and
a magnetic bridge connection between the first shield structure and the second shield structure.

18. The dual writer of claim 17 and wherein the dual writer further comprises a bearing surface, and wherein the magnetic bridge connects the first shield structure to the second shield structure at the bearing surface.

19. The dual writer of claim 18 and wherein the first shield structure further comprises a first side shield, and wherein the second shield structure further comprises a second side shield.

20. The dual writer of claim 19 and wherein:
the magnetic bridge connects the first side shield to the second side shield at the bearing surface; or
the magnetic bridge connects the first trailing edge shield and the second trailing edge shield at the bearing surface.

* * * * *